United States Patent [19]

Murakami et al.

[11] Patent Number: 4,920,480
[45] Date of Patent: Apr. 24, 1990

[54] DIGITAL SIGNAL PROCESSOR

[75] Inventors: Tokumichi Murakami; Koh Kamizawa; Masatoshi Kameyama, all of Kanagawa, Japan

[73] Assignee: Mitsubishi Denki Kabushiki Kaisha, Tokyo, Japan

[21] Appl. No.: 164,257

[22] Filed: Mar. 4, 1988

[30] Foreign Application Priority Data

Mar. 5, 1987 [JP] Japan ................. 62-50755

[51] Int. Cl.$^5$ ............................................. G06F 13/14
[52] U.S. Cl. ................... 364/200; 364/243.3; 364/242.3; 364/240.2
[58] Field of Search ... 364/200 MS File, 900 MS File

[56] References Cited

U.S. PATENT DOCUMENTS

| 4,400,772 | 8/1983 | Broyles et al. | 364/200 |
|---|---|---|---|
| 4,433,378 | 2/1984 | Leger | 364/200 |
| 4,439,839 | 3/1984 | Kneib et al. | 364/900 |
| 4,471,427 | 9/1984 | Harris | 364/200 |
| 4,494,187 | 1/1985 | Simpson | 364/200 |
| 4,507,727 | 3/1985 | Magar | 364/200 |
| 4,574,348 | 3/1986 | Scallon | 364/200 |
| 4,577,282 | 3/1986 | Caudel et al. | 364/200 |
| 4,586,131 | 4/1986 | Caudel et al. | 364/200 |
| 4,713,748 | 12/1987 | Magar et al. | 364/200 |
| 4,713,749 | 12/1987 | Magar et al. | 364/200 |

OTHER PUBLICATIONS

Jonathan Allen, "Computer Architecture for Signal Processing", Proceedings of the IEEE, vol. 63, No. 4, Apr. 4, 1975, pp. 624-633.
Takao Kaneko et al., "A 50ns Floating-Point Signal Processor VLSI", IEEE, 1986, pp. 401-404.
Louis Schirm IV, "Packing a Signal Processor Onto a Single Digital Board, Electronics", Dec. 20, 1979, pp. 109-115.

Primary Examiner—Gareth D. Shaw
Assistant Examiner—Debra A. Chun
Attorney, Agent, or Firm—Bernard, Rothwell & Brown

[57] ABSTRACT

A digital signal processor comprises a bus structure including a program bus, data bus and data input/output bus, a program memory, a program controller, an internal data memory made up of a plurality of 2-port memories for storing block data, an arithmetic operator, a DMA controller for implementing block data input-/output between the internal data memory and an external data memory in parallel to an internal operation by the arithmetic operator, an address generator for generating addresses for the internal operation and DMA transfer concurrently and in parallel to the internal operation, and parallel data input/output ports for implementing parallel data communication with an external device independently of input/output operations and in asynchronous fashion. The processor executes an intricate adaptive process algorism such as image signal processing at high speed and at high throughput.

5 Claims, 5 Drawing Sheets

DIGITAL SIGNAL PROCESSOR

BACKGROUND OF THE INVENTION

1. Field of the Invention

The present invention relates to a digital signal processor for implementing computation which is mainly intended for systems of signals.

2. Description of the Prior Art

Figure 1:
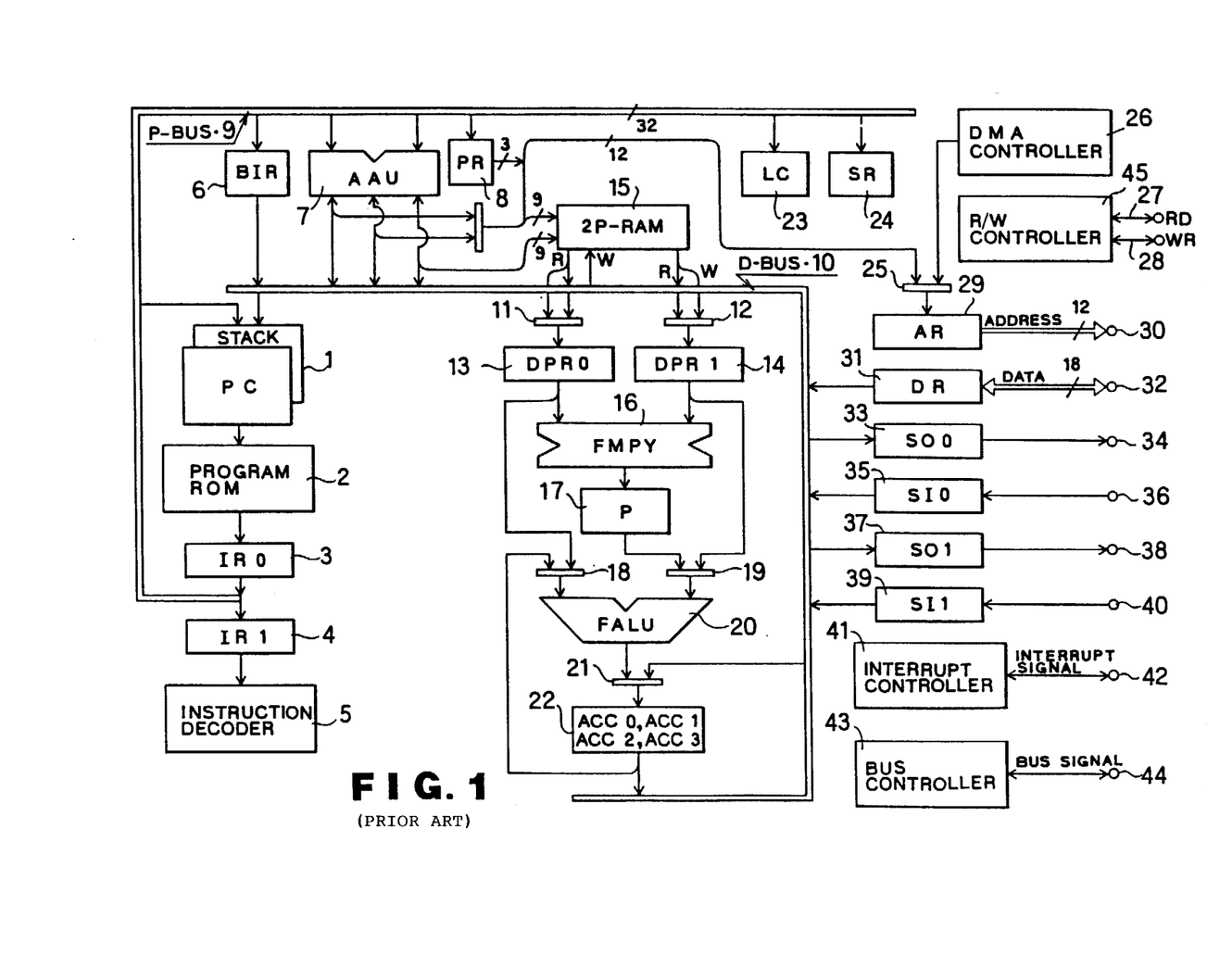
FIG. 1 is a block diagram showing the arrangement of the conventional digital signal processor (DSSP1)

FIG. 1 shows in block diagram a conventional digital signal processor intended mainly for audio signal processing, i.e., Digital Speech Signal Processor 1 (DSSP1) in this example described in the proceeding of symposium of the annual convention of The Institute of Electronics and Communication Engineers of Japan, Communication Section, held in 1986. In the figure, indicated by 1 is a program counter (PC) which incorporates a stack pointer for controlling the program address, 2 is a program ROM in the DSSP1, 3 is an instruction register 0 (IR0) for latching an instruction retrieved from the program ROM 2, 4 is an instruction register 1 (IR1) for latching the instruction released from the IR0 3 onto a program bus P-Bus 9, 5 is an instruction decoder for decoding the instruction held in the IR1 4, 6 is a bus interface register (BIR) for relaying immediate data placed on the P-Bus 9 onto a data bus (D-Bus) 10, 7 is an address arithmetic unit (AAU) which incorporates three address registers for generating addresses, 8 is a page register (PR) which adds high-order 3 bits to a 9-bit address output from the AAU 7 to produce a 12-bit external RAM address, 9 is the program bus (P-Bus) for transferring instructions, 10 is the data bus (D-Bus) for transferring data separately from the P-Bus 9, 11, 12 are selectors, 13 is a data pipeline register 0 (DPR0) for receiving one input for an execution unit (will be described shortly), 14 is a data pipeline register 1 (DPR1) for receiving another input for the execution unit, 15 is an internal 2-port data memory (2P-RAM) having a 512-word capacity, 16 is a floating point multiplier (FMPY) for implementing the 12E6 floating point multiplication for the outputs of the DPR0 13 and DPR1 14, 17 is a pipeline register (P register) for latching the output of the FMPY 16, 18, 19 are selectors, 20 is a floating point arithmetic logic unit (FALU) for implementing the 12E6 floating point operation for two inputs to produce one output, 21 is a selector, 22 are accumulators 0–3 (ACC0–ACC3) each having a 4-word capacity, 23 is a loop counter (LC) for counting the number of loops in a program, 24 is a status register (SR) which indicates all statuses of the processor and controls the mode of operation, especially for setting the interrupt mode of a DMA controller 26. The connections of SR24 in FIG. 1 are omitted for simplicity of representation. 25 is a selector for selecting the outputs of the AAU 7 and DMA controller 26, 26 is the direct memory access (DMA) controller for implementing DMA transfer between serial I/O 33, 35, 37, 39 and an external RAM 32, 45 is a R/W controller for controlling data reading and writing for the external RAM, 27 and 28 are read RD and write WR signals provided by the R/W controller 45, 29 is an address register for latching the address 30 of the external RAM, 31 is a data register DR for latching data on the data bus 32 which is connected to the external RAM, 33 is SO0 for outputting serial output data 0 (34), 35 is SI0 for inputting serial input data 0 (36), 37 is SO1 for outputting serial output data 1 (38), 39 is SI1 for inputting serial input data 1 (40), 41 is an interrupt controller for analyzing the interrupt signal 42 to determine the interrupt, and 43 is a bus controller for controlling the data bus 32 connected to the external data RAM using the bus signal 44.

Figure 2:
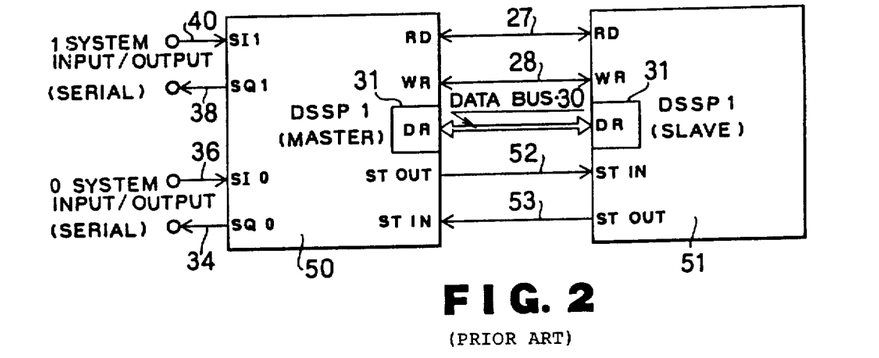
FIG. 2 is a block diagram of a multiprocessor system based on the conventional digital signal processor shown in FIG. 1.

FIG. 2 shows an example of arrangement using two sets of DSSP1 shown in FIG. 1 for implementing a sample-by-sample process through the serial data ports. In the figure, indicated by 50 is a master processor which is the entire DSSP1 shown in FIG. 1, 52 is a request signal issued by the master processor 50 to a slave processor 51, and 53 is an acknowledge signal issued by the slave processor 51 to the master processor 50.

Next, the operation of the above conventional digital signal processor will be explained in brief. This system arrangement has the separate P-Bus 9 and D-Bus 10, allowing the instruction decoder 5 to perform instruction fetching and the FMPY 16 and FALU 20 to execute internal operations concurrently. In addition, address generation by the AAU 7 takes place in parallel to these operations, thereby preventing instruction overhead from the address generation. The system has a DMA transfer function by the DMA controller between the external data bus 32 and the two serial I/O systems 33, 35 and 37, 39. Since the DMA transfer uses the D-Bus 10, the internal operation halts for a 6 machine cycle time for each word transfer during the DMA transfer cycle. The parallel processing ability of this system is summarized as follows.

(1) Address generation (primary address) by AAU 7.
(2) Floating point multiplication by FMPY 16.
(3) Floating point arithmetic/logic operation by FALU 20.
(4) Data transfer between 2P-RAM 15 and external RAM.
(5) Data transfer between two serial I/O systems 33, 35/37, 39 and external RAM (this data transfer causes an internal operation to halt for a 6 machine cycle time for each transferred word).

The system allots one system of serial I/O 33, 35, 37, 39 to the A/D converter and another system to the transmission path, making itself suitable for arranging on a single chip a full-duplex audio codec which implements DMA transfer in units of transmission frame and buffering using an external RAM, rather than for fast processing mass data using an external memory.

The arithmetic operator constituted by the FMPY 16 and FALU 20 is capable of executing a product-sum operation, which is performed often in FIR filters and FFT (fast Fourier transformation), in one machine cycle, as in the case of a multiplier-accumulator pair described in article "Packing a single processor onto a single digital board", by Louis Schirm, Electronics, Dec. 20, 1979. Namely, this system achieves the maximum throughput when the multiply-accumulation operation is carried out continuously, and it reaches 40 MIPS (mega instructions per second) when the machine cycle is 50 ns.

However, general signal processings include other types of operations such as absolute value accumulation and differential absolute value evaluation besides the multiply-accumulation operation, in which case the FMPY 16 cannot be used, resulting in a halved throughput of 20 MIPS achieved by the FALU 20 alone.

Next, the operation of the DSSP1 multiprocessor configuration will be described in connection with FIG. 2. Serial input data of system 0 (36) and system 1 (40) entered to the master processor 50 are rendered a certain computation by the processor 50, which yields an intermediate result. The master processor 50 issues a data transfer request 52 to the slave processor 51 and, after confirming a data transfer ready 53 from the slave processor 51, transfers the intermediate result held in the DR 31 to the slave processor 51 through the data bus 30. The DR 31 is timed for latching on the basis of the RD 27 and WR 28.

Subsequently, the intermediate result processed by the slave processor 51 is transferred back to the master processor 50 using a reverse procedure and, after being rendered a final computation by the processor 50, sent to the serial data output ports 34 and 38 of system 0 and system 1.

This system arrangement is based on the anticipation of the intricate signal processing algorism which is infeasible to carry out by a single DSSP1 and the requirement of throughput which is beyond the ability of a single DSSP 1. However, the system involves the following problems. First, in case of mass data transfer by way of the data bus 30, the throughput is not improved as expected due to the overhead of data transfer control. The master and slave processors 50 and 51 must be in complete synchronism in running their programs, and if the load is concentrated to one of processors the system throughout is determined by its maximum load. Finally, data transfer through the data bus 30 creates a bus contention with a process using the external RAM which is connected through the data bus 30, resulting in a possible significant fall in throughput.

Although these problems may easily be overcome by addition of an external control circuit, this will result in an increased hardware and lowered flexibility and the abandonment of the superiority of the signal processor in a processor-based system. Especially, image signal processing is mostly required to perform a very fast processing for mass data in a multiprocessor configuration using a video frame memory, and the above-mentioned scheme imposes a most significant problem in introducing processors in image signal processing.

As described above, the conventional digital signal processor is not always suitable for signal processings such as image signal processing, and an intentional application of this will incur an increased number of processors needed for compensating the lowered throughput and an increased hardware of external circuitry due to the increased load. As a result, it has been difficult to introduce a processor-based system to this technical field.

SUMMARY OF THE INVENTION

The present invention is intended to solve the foregoing prior art deficiencies, and its prime object is to provide a digital signal processor as an image signal processing system which enables the introduction of a processor-based system to signal processing mainly intended for image signal processing and is applicable to various applications by utilization of compact and flexible features that are the advantages of the processor-based system.

In order to achieve the above objective, the inventive digital signal processor comprises a bus structure including a program bus, data bus and data input/output bus, an internal data memory consisting of a plurality of 2-port memories for storing block data, a DMA controller for implementing block data transfer between the external data memory and the internal data memory in parallel fashion with an internal computation, an address generator which implements 22 dimensional address generation for at least five separate systems concurrently, an arithmetic operator having multiply-accumulation oriented and general operation oriented pipeline cycles, an asynchronous PIO incorporating FIFO, and a program controller which implements the multiple branching program control in accordance with a preset jump table when a conditional branching with multiple conditions is encountered.

The inventive bus structure allows the DMA transfer between the internal and external memories to take place in parallel to internal computation, the arithmetic operator having the multiply-accumulation oriented and general operation oriented pipeline cycles deals with an image processing algorism at a high throughput, the asynchronous PIO including FIFO improves the throughput in the case of multiprocessor configuration, and the multiple branching program controller carries out an intricate adaptive processing algorism at a high speed.

Those and other objects and advantages of the present invention will become more apparent from the following detailed description taken in conjunction with the accompanying drawings.

DETAILED DESCRIPTION OF THE PREFERRED EMBODIMENTS

An embodiment of this invention will now be described with reference to the drawings.

Figure 3:
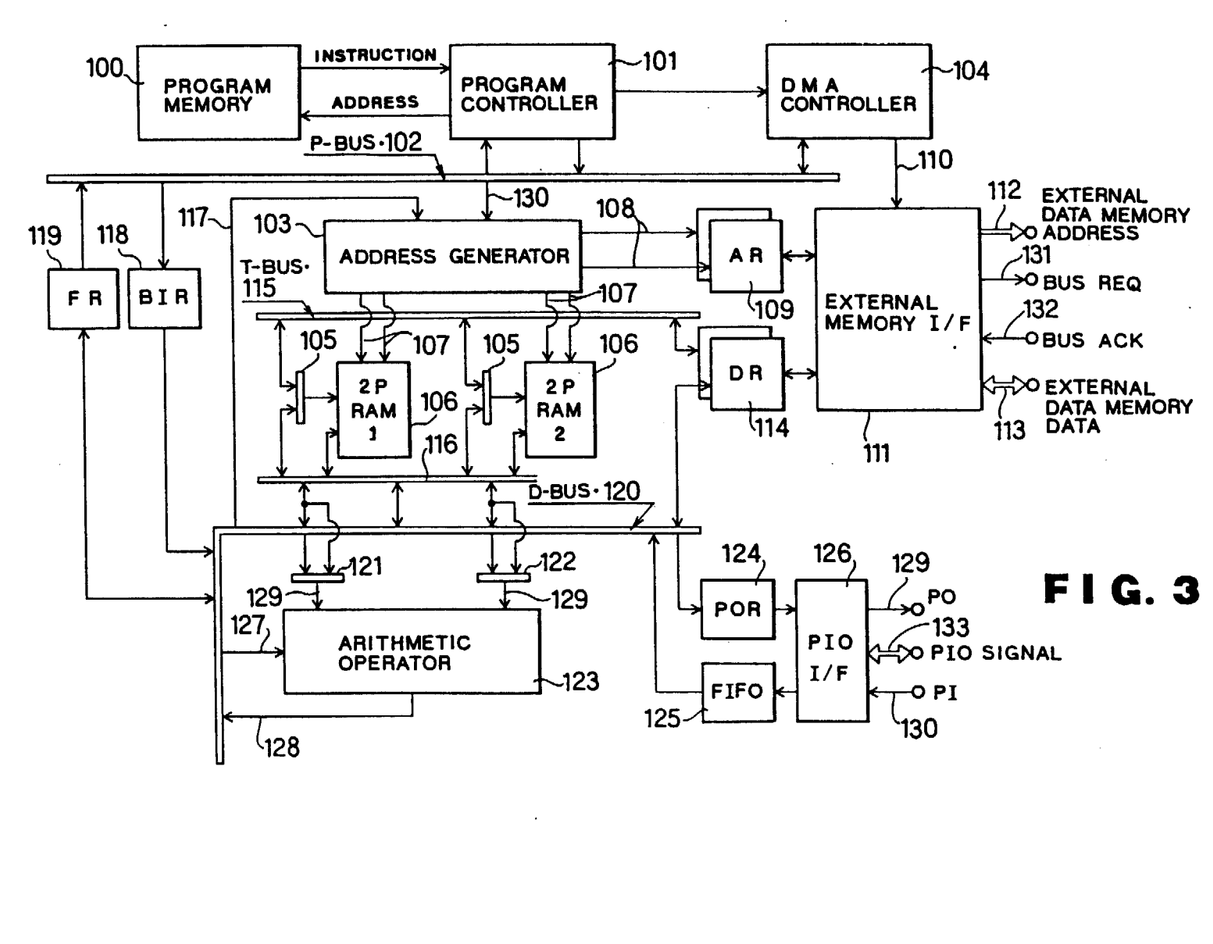
FIG. 3 is a block diagram showing the arrangement of the digital signal processor embodying the present invention.

In FIG. 3 showing the inventive digital signal processor, indicated by 100 is a program memory for storing a program, 101 is a program controller, 102 is a program bus (P-Bus), which is one of the bus structures, for transferring an instruction provided by the program controller 101, 103 is an address generator which generates six addresses concurrently, 104 is a direct memory access (DMA) controller, 105 is a bidirectional selector, 106 is an internal data memory consisting of two 2-port (2P) RAMs, 107 is an address to the internal data memory 106, 108 is an external data memory address, 109 is an address register (AR) which holds the external memory address for DMA and external memory address for internal operation to output an external data memory address 112 by way of an external memory interface (I/F) 111, 110 is the DMA control signal, 113 is external data memory data, 114 is a data register (DR) having a 2-word capacity for T-Bus 115 and D-Bus 120 in the bus structure for holding the external data memory data 113 transacted through the external memory interface 111, 115 is the data input/output bus (T-Bus) dedicated to data input and output, 116 is a bidirectional 4-3 selector for selecting ports for the internal data memory 106, 117 is a data path from the D-Bus 120 to the address generator 103, 118 is a bus interface register (BIR) for holding immediate data transferred from the P-Bus 102 to the D-Bus 120, 119 is a flag register (FR), 120 is the data bus (D-Bus) for transferring internal operation data, 121 and 122 are selectors, 123 is an arithmetic operator for implementing internal operations, 124 is a parallel output register (POR) for outputting parallel data to the external device, 125 is a first-in-first-out (FIFO) memory for receiving parallel data from the external device, 126 is a PIO interface for relaying the parallel data communication with the external device, 127 is a data path from the D-Bus 120 for initializing the working register in the arithmetic operator 123, 128 is a data path for outputting the result of the arithmetic operator 123 to the D-Bus 120, 129 is parallel output data, 130 is parallel input data, 131 is a bus request signal, 132 is a bus acknowledge signal, and 133 is a PIO control signal.

Figure 4:
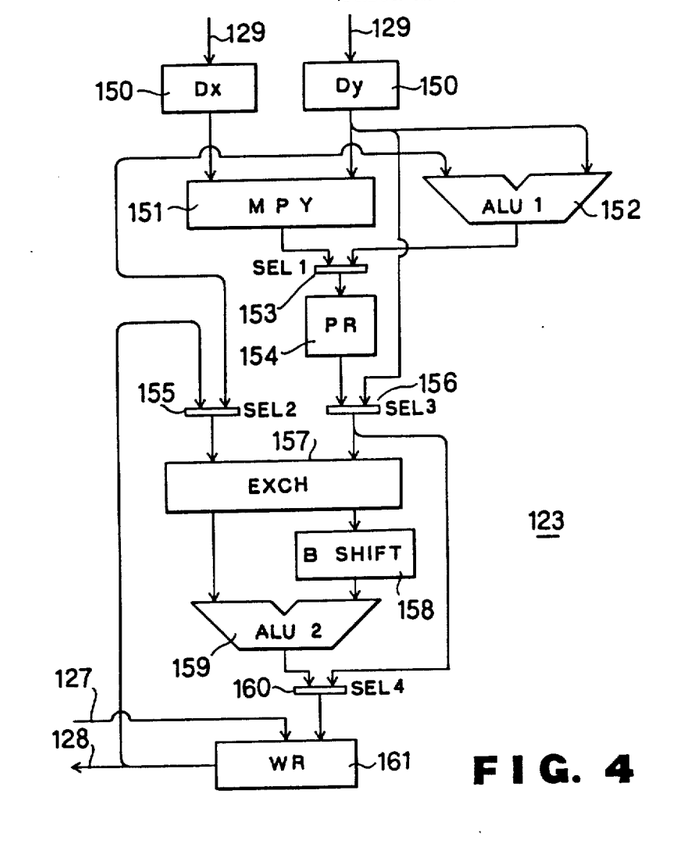
FIG. 4 is a block diagram showing the arrangement of the arithmetic operator 123 shown in FIG. 3.

FIG. 4 shows the arrangement of the arithmetic operator 123 shown in FIG. 3. In the figure, indicated by 150 are data input registers (Dx, Dy), 151 is a multiplier (MPY), 152 is a first arithmetic/logic unit (ALU1), 153 is a first selector, 154 is a pipeline register (PR), 155 is a second selector, 156 is a third selector, 157 is a data exchanger (EXCH), 158 is a barrel shifter (BSHIFT), 159 is a second arithmetic/logic unit (ALU2), 160 is a fourth selector, and 161 is a working register (WR) having a capacity of at least one word.

Figure 5:
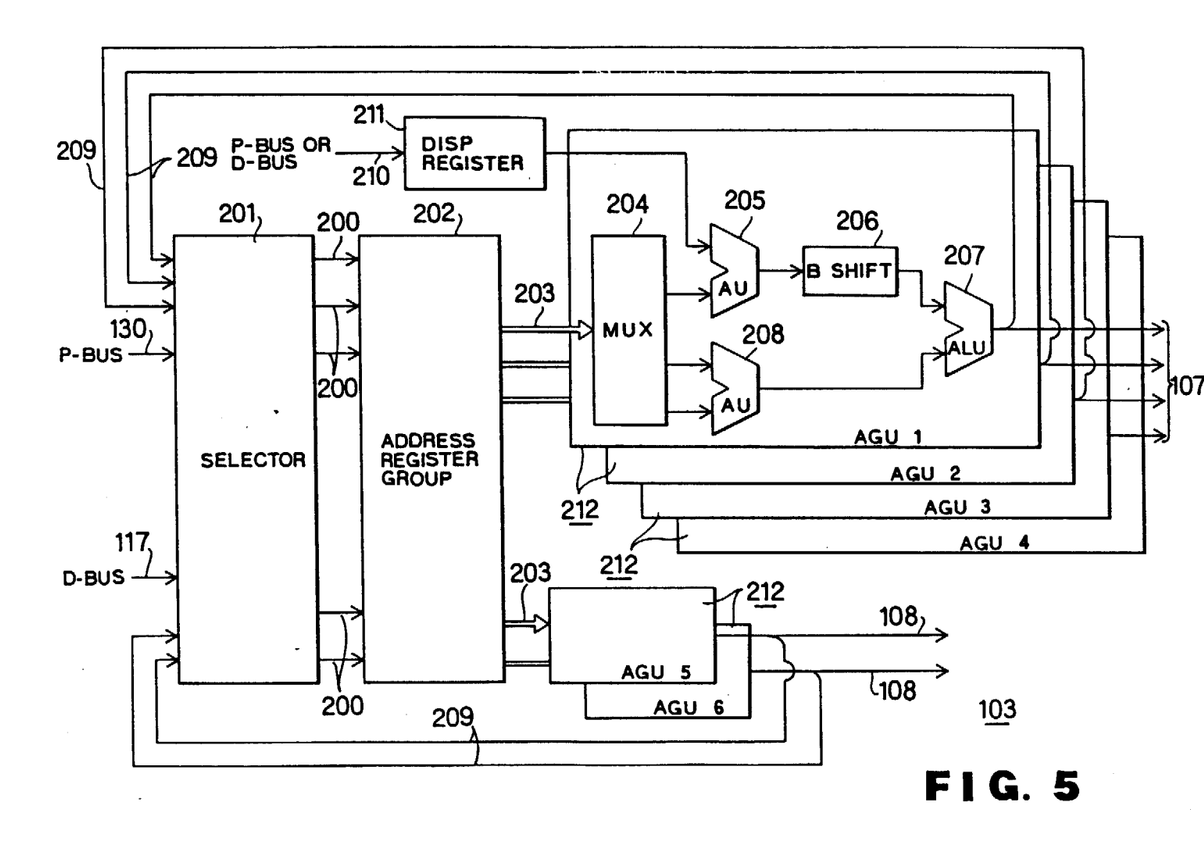
FIG. 5 is a block diagram showing the arrangement of the address generator 103 shown in FIG. 3.

FIG. 5 shows the arrangement of the address generator 103 shown in FIG. 3. In the figure, indicated by 200 are address data given to an address register group 202, 201 is a selector which selects the address data 200 from among feedback data 209 from the address generator (AGU) 212, data 130 on the P-Bus 102 and data 117 on the D-Bus 120, 203 are address data sets produced by selecting arbitrarily a plurality of data in the address register group 202, 204 is a multiplexer (MUX) for separating the address data sets 203, 205 is an arithmetic unit (AU) for addition and subtraction, 206 is a barrel shifter (BSHIFT), 207 is an arithmetic/logic unit (ALU) implementing at least addition and subtraction, 208 is an arithmetic unit (AU) for addition and subtraction, 209 is feedback data from the AGU, 210 is displacement data on the P-Bus 102 or D-Bus 120, 211 is a displacement register, and 212 is an address generator (AGU) including four units for the internal memories 106 and two units for the external data memory address 112.

Figure 6:
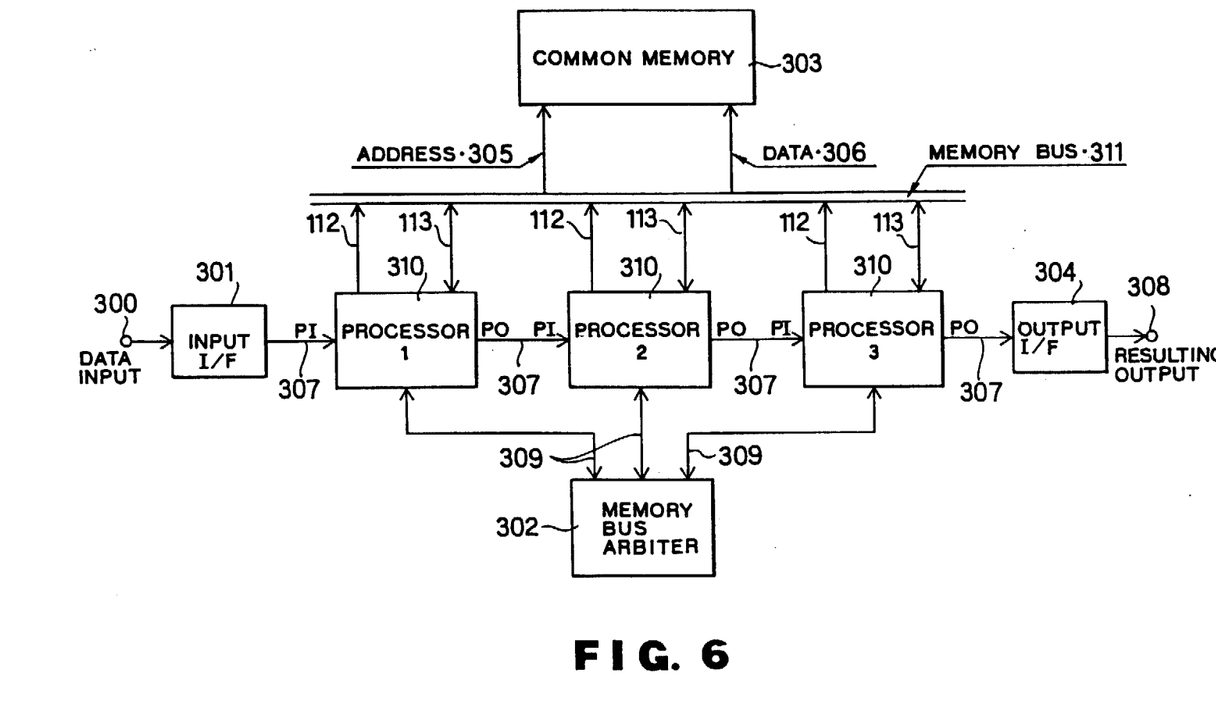
FIG. 6 is a block diagram showing an embodiment of the serial multiprocessor system using the digital signal processor shown in FIG. 3.

FIG. 6 shows a multiprocessor system configured by connecting three digital signal processors of FIG. 3 in series through the parallel data port (PIO) interface 126. In the figure, indicated by 300 is a data input terminal, 301 is an input interface, 302 is a memory bus arbiter, 303 is a common memory, 304 is an output interface, 305 is an address of the common memory 303, 306 is data of the common memory 303, 307 is a parallel data path used for data communication between the processors 310, 308 is a resulting output, 309 are bus signals for performing the control between the processors 310 and memory bus arbiter 302, 310 are the processors each shown in FIG. 3, and 311 is a memory bus.

Next, the operation will be explained.

In FIG. 3, instructions stored in the program memory 100 are read out sequentially by being addressed by the program controller 101, and entered to the program controller 101. The instruction is decoded by the program controller 101 and then placed on the P-Bus 102. In parallel to this operation, the D-Bus 120 executes an internal operation for the instruction which has been outputted on the P-Bus 102 one machine cycle ago. The address generator 103 generates the addresses 107 and 108 of the 2P-RAM 106 and external data memory associated with the internal operation for three units concurrently and in parallel to the internal operation. At the same time, in parallel to the internal operation, the DMA controller 104 implements data transfer between the 2P-RAM 106 and external data memory by way of the T-Bus 115. Through the above operations, the processor system carries out the following processings in parallel.

(1) Instruction fetching and transfer.
(2) Six address generation by dedicated address generator.
(3) Direct data transfer between external data memory and internal data memory 106.
(4) Data transfer with external data memory through D-Bus 120 or data transfer with PIO 126.
(5) Internal operation by execution unit 123.

Accordingly, in this processor system, the DMA controller 104 fetches block data from the external data memory into the internal data memory 106 and stores the operational result again in the internal data memory 106, and thereafter the DMA controller 104 transfers it to the external data memory. At the same time, the system implements asynchronous communication with the external device by way of the PIO interface 126 efficiently with little overhead and connection loss.

The program controller 101 stores in advance the program branch destination address or the differential address between the current address and branch destination address in a memory having 2m (m is an integer larger than or equal to one) addresses, obtains the program branch destination address or differential address by addressing the memory using a bit pattern of arbitrary k bits in a 1-bit flag register for storing test flag bits of l in number (where l is an integer larger than one; k is smaller than or equal to l and m), and causes the program to branch to the indicated branch destination address.

The PIO interface 126 implements parallel data communication with the external device using the PIO control signal 133 for the parallel input/output data from the POR 124 and FIFO 125 connected separately to the D-Bus 120. The reason for the provision of the FIFO 125 only on the input side is that the data communication direction is confined to one direction on the basis of the fact that data to be processed are time-series data in most signal processing algorism. Unless the FIFO 125 overflows, it is possible to receive data from the external device independently of the internal operation, whereby the reduction of throughput in multiprocessor configuration can be minimized. Parallel data output is timed by the PIO interface 126 and input is timed by the external device. Namely, the data transmitting party takes the part of master for carrying out the communication. Naturally, the FIFO 125 has a finite capacity and the amount of input data is limited. Therefore, the PIO interface 126 inhibits data input when the FIFO 125 is full. The output of the POR 124 is released only when data input from the external device is not inhibited. In this way, loss of data due to the overflow of FIFO 125 is prevented.

The internal data memory 106 has one port of 2P-RAM connected to the T-Bus 115 or D-Bus 120 by means of the bidirectional selector 105, and it is capable of concurrently reading and writing two input block data 129 to the arithmetic operator and block data on the D-Bus 120 to the internal data memory 106 by means of the bidirectional 4-3selector and, in parallel to this operation, transferring block data from the external data memory interface 111 over the T-Bus 115 under control of the DMA controller 104.

Next, the operation of the arithmetic operator 123 will be explained with reference to FIG. 4. Two input data entered to the data input registers 150 are delivered simultaneously to the MPY 151 and ALU1 152, and rendered multiplication and other arithmetic operation in one machine cycle. Either output of the MPY 151 or ALU1 152 is selected by the first selector 153, and the selected output is latched by the PR 154 at the end of the machine cycle to terminate the initial stage of pipeline. In the next stage, the second selector 155 and third selector 156 select certain data, which are entered to the ALU2 159 through the EXCH 157 and BSHIFT 158, and rendered an arithmetic operation in one machine cycle. At the end of the machine cycle, the outputs of the ALU2 159 and PR 154 are selected by the selector 160 under a certain instruction and latched in the working register 161. Finally, one of the contents of WR 161 is selected, and the data is placed on the output line 128 so that it is outputted on the D-Bus 120.

For the above operations, the arithmetic operator 123 carries out the following processings in parallel in one machine cycle.

(1) Input of two data.
(2) Multiplication of arithmetic operation 1.
(3) Data exchange and barrel shift.
(4) Arithmetic operation 2.
(5) Latching in working register.
(6) Output to D-Bus 120.

Accordingly, in contrast to the conventional system arrangement which is oriented to the multiply-accumulation operation, the inventive arrangement deals with arithmetic operations such as absolute value summation and differential absolute value evaluation in the same efficiency as for product-sum, in addition to the product-sum operation.

The inventive arrangement can double the throughput in dealing with operations which do not need a high accuracy by processing data with n-bit width dividedly and concurrently with the MPY 151, ALU1 152 and ALU2 159 which are each divided into a upper n/2 bits and lower n/2 bits. This operation is readily performed by suspending the partial multiplication in the MPY 151 (at n/2 bit) and cutting the carried of ALU1 152 and ALU2 159 on the way (at n/2 bit).

Next, the operation of the address generator 103 will be explained with reference to FIG. 5. Feedback data from the P-Bus 130, D-Bus 117 and AGU 212 are selected by the selector 201 using a certain instruction, thereby providing latched data 200 to the address register group 202. After that, a complex operation for data 203 formed through arbitrary selection (more than one) of arbitrary contents of the address register group 202 and the contents of the displacement register 211 is processed with the AGU 212 to produce the addresses 107 and 108 and feedback data 209. The AGU 212 includes four systems for the internal data memory 106 and two units for the external memory interface 111, a total of six units, and they operates in parallel.

The memory usually has the 1-dimensional address (linear address), but for much signal processing, particularly image signal processing, the 2-dimensional address is useful for processing. Accordingly, the AGU 212 generates the regular 2-dimensional address with the MUX 204, AU 205 and AU 208 separately for horizontal and vertical directions of the picture by implementing the arithmetic operation and modulo operation, and produces the 1-dimensional address for memory by processing the regular 2-dimensional address for the weighting addition of two addresses in the horizontal and vertical directions with the BSHIFT 206 and ALU 207. The MUX 204 produces each component of the 2-dimensional address through bit discomposition and recomposition for the feedback data 209 and address register data 203. This eliminates the need of calculation of the 2-dimensional address by the arithmetic operator 123, and 2-dimensional data can be processed without a decay of throughput.

Finally, the operation of the serial-type microprocessor system will be explained with reference to FIG. 6. The processors 310 have their input and output ports of PIO interface 126 chained, and implement pipeline processings in which data is processed while being fed from processor 1 to processor 2 and to processor 3. The common memory 303 is used for the video frame memory, for example, and it can be accessed equally from all processors 310. In order to prevent the access contention to the memory bus 311, the memory bus control signal 309 is exchanged among the processors 310 and memory bus arbiter 302 for the access request arbitration.

Since FIFO is provided at the input of the PIO interface 126, it is not necessary to have a complete synchronism for the program operation among the processors 310. This minimizes the overhead of data communication by the PIO, and the throughput of this multiprocessor system becomes virtually equal to the maximum value of the average processing time for the process allotted to each processor 310. Generally, there is a great difference between the average value and maximum value of processing time, and the improvement in process efficiency by this difference can be expected.

Although in the foregoing embodiment, the control of FIFO 125 is performed based on the test as to whether the FIFO 125 is full, and the parallel data communication has been done, the control may be based on the test as to whether a space is available for entering one block of data for block data transfer.

Although the foregoing embodiment has been described mainly for digital signal processing, the system may be applied to other field for fast processing mass data (e.g., numerical analysis), and the same effectiveness as the above embodiment is attained.

Although the above embodiment has been described for the serial-type multiprocessor system, it may be a parallel-type or hierarchy-type multiprocessor system, and the same effectiveness as the above embodiment is attained.

According to this invention, as described above, the digital signal processor is configured to be suitable for many signal processing fields such as image signal processing in which fast processing of mass data while accessing memory is required, whereby a compact, flexible and inexpensive signal processing system can be constructed.

What is claimed is:

1. A digital signal processor comprising:
    a bus structure including a program bus for instruction transfer, a data bus only for internal data transfer and a data input/output bus only for data input and output;

a program memory which is separated from data memories for storing a certain program;

a program controller connected to said program memory and to said program bus for reading out said program from said program memory and for executing instruction transfer, internal operation and data input/output in parallel fashion;

an internal data memory comprising a plurality of 2-port memories, connected selectively to said data bus and said data input/output bus, and adapted to store data in block units;

an arithmetic operator connected selectively to said data bus and said internal memory for executing internal operations including binomial operations;

a direct memory access (DMA) controller connected to said program controller and to said program bus and connecting said internal data memory with an external data memory through said data input/output bus to implement DMA transfer for block data in parallel to said internal operation;

an address generator which generates an address of said internal data memory for internal operation by said arithmetic operator and an address of said external data memory for DMA transfer by said DMA controller concurrently and in parallel to said internal operation, said address generator being connected to said program bus, said data bus and said internal data memory; and parallel data input/output interface means which include a first-in first-out (FIFO) memory and which connect an external device to said data bus and said FIFO memory to implement parallel data communication with said external device independently of input/output operations and in asynchronous fashion.

2. A digital signal processor according to claim 1, wherein said arithmetic operator comprises a first arithmetic/logic unit which receives two input data and performs at least addition or subtraction in a single instruction cycle; a multiplier which receives said two input data simultaneously with said arithmetic/logic unit and performs multiplication in one instruction cycle; a pipeline register which selectively stores one of outputs from said multiplier and said first arithmetic/logic unit; a data exchanger which selectively exchanges said two input data with an output of said pipeline register at first and second outputs thereof; a barrel shifter which shifts one of the outputs of said data exchanger for an arbitrary number of bits right or left; a second arithmetic/logic unit which receives the output of said barrel shifter and another output of said data exchanger to perform at least addition or subtraction; and a working register which stores the output of said second arithmetic/logic unit.

3. A digital signal processor according to claim, wherein said arithmetic operator comprises a circuit which splits data to said first and second arithmetic/logic units and multiplier by dividing said data into high-order n/2 bits and low-order n/2 bits, and performs arithmetic operations on the split sections independently.

4. A digital signal processor according to claim 1, wherein said program controller comprises a controller which stores in a memory having addresses of 2m (where m is an integer larger than or equal to one) a program branch destination address or a differential address between a current address and a branch destination address, obtains the program branch destination address, or differential address by addressing said memory using a bit pattern of arbitrary k bits in a l-bit flag register in which test flag bits of l in number are stored (where l is an integer larger than or equal to one, and k is an integer smaller than or equal to l and m), and causes said program to branch to the indicated branch destination address.

5. A digital signal processor according to claim 1, wherein said address generator comprises an address generator including at least five systems of address generating units which generate a regular 2-dimensional address in logical sense by implementing modulo addition-subtraction or accumulation separately for addresses in the horizontal and vertical directions of a picture, and subsequently generate a 1-dimensional address of said internal data memory or external data memory through weighting addition for two addresses in the horizontal and vertical directions.

* * * * *